United States Patent
Tucker

[15] 3,679,339
[45] July 25, 1972

[54] MOLD HAVING A SLIDE PLATE FOR FORMING ARTICLES HAVING A PROJECTION OR RECESS

[72] Inventor: Archie J. Tucker, Rochester, N.Y.
[73] Assignee: Eastman Kodak Company, Rochester, N.Y.
[22] Filed: Nov. 27, 1970
[21] Appl. No.: 93,210

[52] U.S. Cl. .............................. 425/242, 249/66, 425/249, 425/444
[51] Int. Cl. .......................................................... B29f 1/14
[58] Field of Search ......... 18/2 RM, 30 WM, 30 WN, 30 LA, 18/42 D, DIG. 58, 30; 249/66

[56] References Cited

UNITED STATES PATENTS 2,875,472  3/1959  Marcus ........................... 18/42 D X
3,456,913  7/1969  Lutz ................................ 18/DIG. 58
2,400,024  5/1946  Roehl .............................. 18/DIG. 58
3,135,993  6/1964  Ryan ............................... 18/42 D X Primary Examiner—J. Spencer Overholser
Assistant Examiner—David S. Safran
Attorney—W. O. Hodsdon and Spencer L. Blaylock

[57] ABSTRACT

Apparatus for molding plastic articles. The apparatus includes a cavity piece, a force piece, and a slide plate which cooperate to define a molding cavity of the shape of the article to be molded. The slide plate is provided with a cavity to form a projection on the article and a camming surface which forms a recess in the molded article adjacent the projection. The slide plate during stripping of the article from the mold moves in a direction normal to the direction of the projection whereby the camming surface cams the article away from the slide plate to strip the projection from the cavity.

5 Claims, 4 Drawing Figures

PATENTED JUL 25 1972 3,679,339
SHEET 1 OF 2
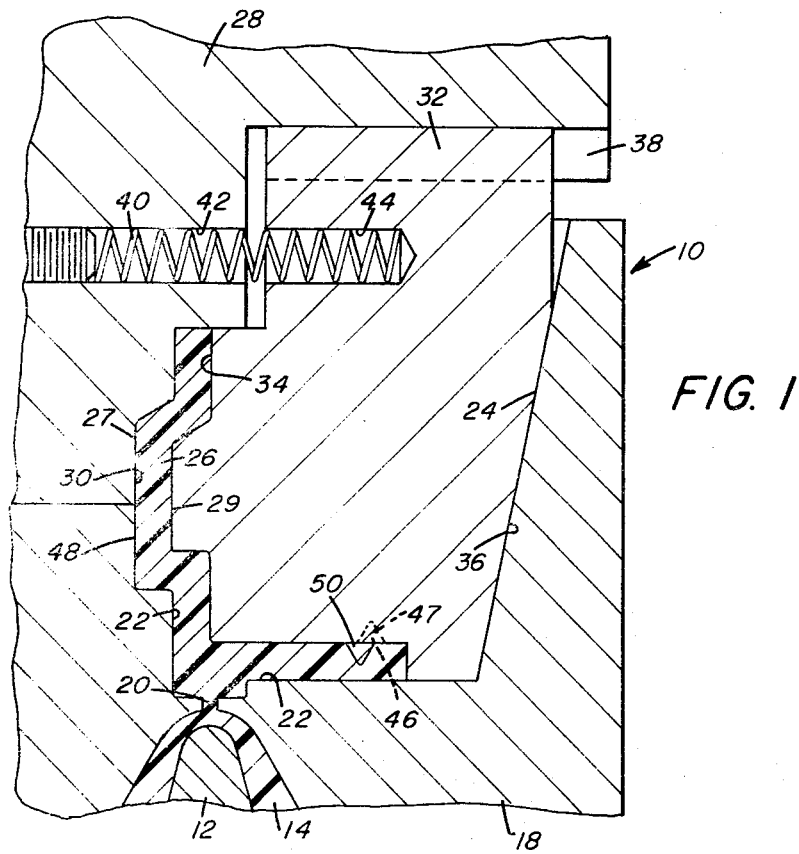
FIG. 1
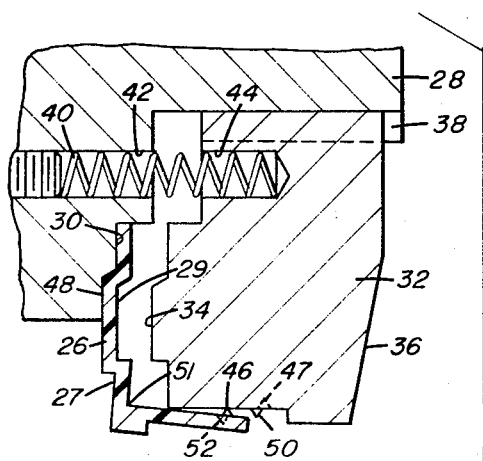
FIG. 2
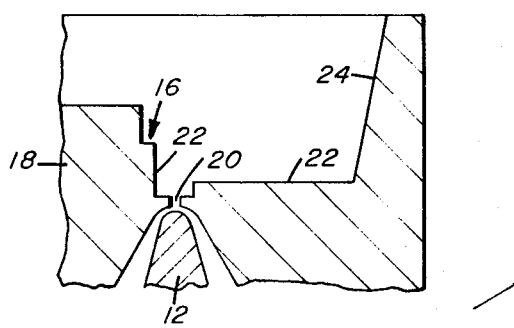
ARCHIE J. TUCKER
INVENTOR.
ATTORNEYS

ARCHIE J. TUCKER
INVENTOR.

ATTORNEYS

MOLD HAVING A SLIDE PLATE FOR FORMING ARTICLES HAVING A PROJECTION OR RECESS

FIELD OF THE INVENTION

This invention relates generally to apparatus for molding articles and more particularly to apparatus for injection molding plastic articles.

BACKGROUND OF THE INVENTION

In the injection molding of plastic articles, the articles are molded about a core or slide plate which cooperates with a force piece and cavity piece of the mold to define the molding cavity. A problem exists in molding articles having projections or recesses extending in nonparallel direction normal to the direction of withdrawal of the core from the mold. The articles during withdrawal of the core from the mold. The articles during withdrawal of the core or slide plate from the mold are still in a somewhat plastic condition. In stripping articles having projections thereon from the core or slide plate, the still plastic projections may be damaged when the core is moved in a direction normal to the direction of the projection.

Various attempts have been made to prevent damage to the projections on the injection molded articles during stripping from the core and/or removal from the mold. It has been proposed to extend or improve the cooling cycle to further solidify the projection; however, such proposals increase the molding cycle time thereby reducing production and increasing costs. It has also been suggested that multi-part cores or slide plates be utilized which can be withdrawn separately and in different directions. Such multi-part slide plates and cores are expensive and unduly complicate the molding operation and apparatus.

SUMMARY OF THE INVENTION

It is therefor an object of the present invention to provide an improved molding apparatus for removing an article having a projection thereon from a mold without damaging the projection on the article. A further object of this invention is to provide an injection molding apparatus wherein the core or slide plate may be stripped from the article without damaging projections on the article. Another object of the present invention is to provide a plastic injection molding apparatus for molding articles having projections thereon wherein the articles may be readily removed from the mold without damage to the projection or article. A further object of this invention is to provide an injection molding apparatus wherein the molded article is cammed away from the slide plate during withdrawal of the article from the mold.

These and other objects and advantages are accomplished by providing the core or slide plate of the injection molding apparatus with a camming surface adjacent the recess that forms the projection on the molded article. During removal of the slide plate from the cavity mold in a direction normal to the direction of the projection, the camming surface cams the molded projection out of the recess.

BRIEF DESCRIPTION OF THE DRAWINGS

FIG. 1 is a partial cross-sectional view of an injection mold embodying this invention with the mold in a closed position;

FIG. 2 is a cross-sectional view similar to FIG. 1 but with the mold in a partially opened position and to a slightly reduced scale;

DETAILED DESCRIPTION OF A PREFERRED EMBODIMENT

Figure 4:
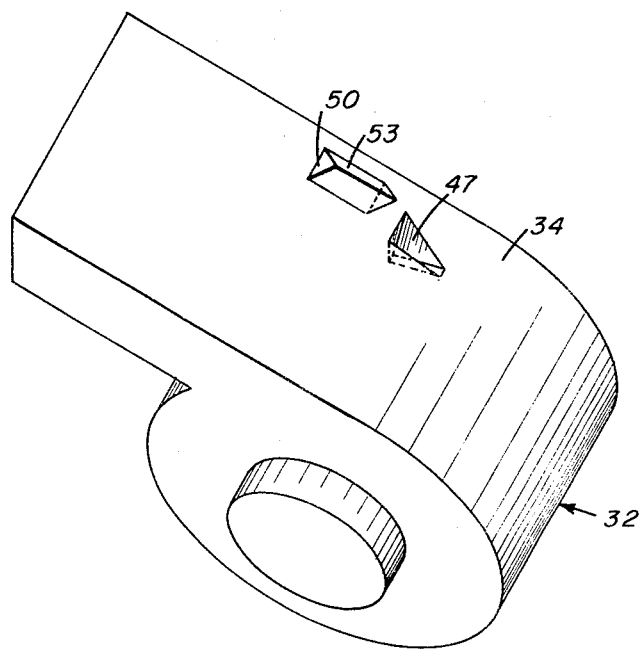
FIG. 4 is a perspective view of a slide plate or core embodying the invention.
Figure 3:
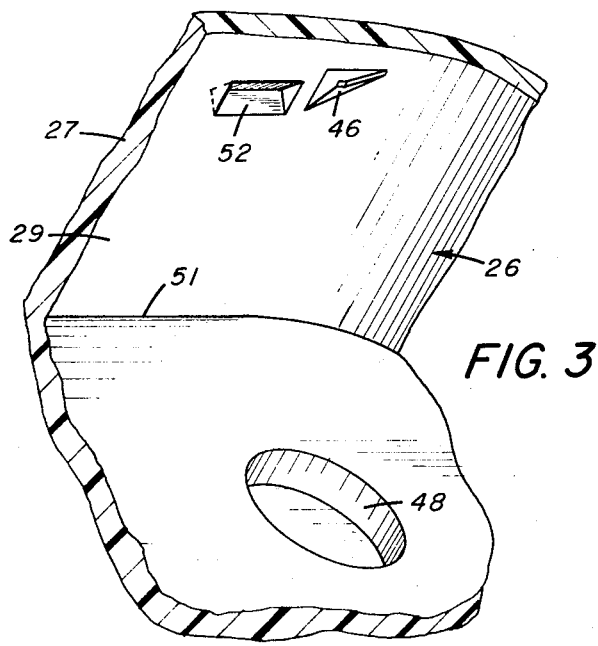
FIG. 3 is a perspective view of a portion of the molded article.

Referring now to the drawings, reference numeral 10 denotes the mold assembly of an injection molding machine of conventional design which includes a nozzle 12 for injecting, under pressure, molten plastic material 14 into a molding cavity 16 all in the conventional manner. The mold assembly 10 includes a cavity piece or female mold 18 which cavity piece is secured to the injection molding machine frame (not shown). The cavity piece 18 is provided with a gate 20 in open communication with the nozzle 12, an article forming surface 22 and a guiding surface 24. The article-forming surface 22 forms a portion of the exterior surface 27 of the molded article 26.

In order to form the other portion of the exterior surface 27 of the article 26, a force piece or male mold member 28 is provided. The force piece 28 is moved into and out of contact with the cavity piece 18 by conventional mold actuator means (not shown). The force piece 28 has an article forming surface 30 which forms the remaining portion of the exterior surface of the article 26. The interior or other major surface 29 of the article 26 is formed by a core or slide plate 32 carried by the force piece 28. Thus the cavity piece 18, the force piece 28, and the slide plate 32 cooperate to define the cavity 16 in which the article 26 is formed.

The slide plate 32 is provided with a molding surface 34 to form the interior 29 of the article 26 and a guiding surface 36 to cooperate with the guiding surface 24 on cavity piece 18. The slide plate 32 is carried by the force piece 28 on guideways 38, only one of which is shown in the drawings. A spring 40 is positioned in aligned recesses 42 and 44 located in force piece 28 and slide plate 32 respectively. The spring 40 urges the slide member away from the article-forming surface 30 when the mold assembly is being opened as shown in FIG. 2.

In order to move the slide member against the force of the spring 40, the guiding surfaces 24 and 36 are constructed to cooperate with each other. Upon closing of the mold 10 by moving the force piece 28 toward the cavity piece 18, the guiding surfaces force the slide plate 32 to the left as in FIG. 1 to the cavity forming position. Upon opening of the mold the article 26 is retained in contact with the force piece. The guiding surfaces 24 and 36 and the spring 40 cooperate to move the slide member 32 to the right while the force piece 28 is being withdrawn from contact with the cavity piece 18 which in normal operation is along a path normal to the direction of sliding movement of the slide plate 32. Thus, the slide plate moves away from the molded article.

In order to injection mold the article 26 having a projection 46 extending from the interior surface thereof, the molding surface 34 of the slide plate 32 is provided with a recess or cavity 47 of the configuration of the projection 46. In the illustrated embodiment, the article 26 is also provided with an offset portion 48 which extends in a direction normal to the direction the projection 46 extends. The projection 46 extends in a direction normal to the direction of sliding movement of the slide plate 32 and the offset portion 48 extends in a direction parallel to this direction.

In order to prevent damage to the projection 46, since the molding surface 34 slides along the interior 29 of the article 26 which is retained in contact with the force piece 28, an elongated camming portion 50 is provided on the article forming surface 34 in the vicinity of the cavity 47. The camming portion 50 will form a recess 52 on the interior 29 of the article 26. During withdrawal of the force piece 28, the article 26, and the slide plate 32 from the cavity piece 18, the spring 40 forces the slide plate 32 to the right in FIG. 2. Movement of the slide plate 32 forces the article 26 to bend away from the slide plate 32 by sliding over the cam portion 50. The camming away of the article 26 from the slide plate pulls the projection 46 out of the cavity 47 without damage thereto. After the projection 46 has cleared the cavity 47, knock-out pins (not shown) are actuated to eject the article from the mold.

The camming portion 50 is illustrated as being located in the immediate vicinity of the cavity 47 forming the projection 46. This is the preferred embodiment, however, other locations on the same portion of the molding surface 34 will function equally well. In order to insure proper stripping of the projection 46 from the cavity, the camming surface is preferably of greater height than the depth of the cavity 47; however, it may also be the same or slightly shorter. The camming portion 50 or angular rib is substantially triangular in cross section with a camming surface 53 which forces the article away from the base of the camming portion. This movement of the article causes it to bend or flex at the juncture 51 of the two portions of the article.

This invention has been described with reference to injection molding plastic articles. It should be understood that the foregoing apparatus may be utilized in various other molding methods with equal facility. For example, this apparatus may be used in casting metal articles. nonparallel directions or having a projection extending in the direction The invention has been described in detail with particular reference to preferred embodiments thereof, but it will be understood that variations and modifications can be effected within the spirit and scope of the invention.

I claim:

1. A mold for molding an article comprising a cavity piece, a force piece and a slide plate, each having molding surfaces which cooperate to define a molding cavity of the configuration of said article, said cavity piece and said force piece being relatively movable to open and close said molding cavity, said slide plate being carried by one of said pieces and being in movable relationship thereto along a path, means for moving said slide plate along said path, said slide plate molding surface having a projection-forming cavity therein for forming a projection on said article and a camming portion extending from and integral with said slide plate molding surface for camming said article away from said surface during movement of said slide plate along said path and relative to said article upon opening of said molding cavity, said camming portion extending in a direction normal to said slide plate molding surface and said path.

2. A mold according to claim 1 wherein said camming portion is adjacent said projection forming cavity.

3. A mold according to claim 1 wherein said projection-forming cavity extends from said slide plate molding surface in a direction normal to said path.

4. A mold according to claim 1 wherein said cavity piece is fixed and said force piece is movable along a second path.

5. A mold according to claim 4 wherein said slide plate is carried by said force piece and said first path is normal to said second path.

* * * * *

PO-1050
(5/69)

UNITED STATES PATENT OFFICE
CERTIFICATE OF CORRECTION

Patent No. 3,679,339          Dated July 25, 1972

Inventor(s) Archie J. Tucker

It is certified that error appears in the above-identified patent and that said Letters Patent are hereby corrected as shown below:

1. In column 1, line 15, following nonparallel insert -- directions or having a projection extending in the--

2. In column 1, lines 16 and 17, delete "The articles during withdrawal of the core from the mold."

3. In Column 3, line 13, following articles, delete --nonparallel directions or having a projection extending in the direction--

Signed and sealed this 20th day of March 1973.

(SEAL)
Attest:

EDWARD M. FLETCHER, JR.          ROBERT GOTTSCHALK
Attesting Officer                Commissioner of Patents